US009071665B2

(12) United States Patent
Ruan et al.

(10) Patent No.: US 9,071,665 B2
(45) Date of Patent: Jun. 30, 2015

(54) METHOD, DEVICE AND SYSTEM FOR OBTAINING RICH MEDIA FILES

(71) Applicant: TENCENT TECHNOLOGY (SHENZHEN) COMPANY LIMITED, Guangdong (CN)

(72) Inventors: Shudong Ruan, Guangdong (CN); Yu Xu, Guangdong (CN); Weizheng Shen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 51 days.

(21) Appl. No.: 13/845,690

(22) Filed: Mar. 18, 2013

(65) Prior Publication Data

US 2013/0232195 A1   Sep. 5, 2013

Related U.S. Application Data

(63) Continuation of application No. PCT/CN2011/083548, filed on Dec. 6, 2011.

(30) Foreign Application Priority Data

Dec. 6, 2010 (CN) .......................... 2010 1 0580734

(51) Int. Cl.
*G06F 15/16* (2006.01)
*H04L 29/06* (2006.01)
*G06F 17/30* (2006.01)

(52) U.S. Cl.
CPC ........ *H04L 65/602* (2013.01); *G06F 17/30017* (2013.01); *G06F 17/30905* (2013.01)

(58) Field of Classification Search
USPC .................................. 709/203, 223, 228, 224
See application file for complete search history.

(56) References Cited

U.S. PATENT DOCUMENTS

| 7,249,196 | B1 | 7/2007 | Peiffer et al. | |
| 7,546,354 | B1 * | 6/2009 | Fan et al. ....................... | 709/219 |
| 7,801,942 | B2 * | 9/2010 | Caruso et al. ................. | 709/200 |
| 8,176,113 | B2 * | 5/2012 | Caruso et al. ................. | 709/200 |
| 8,370,732 | B2 * | 2/2013 | Black et al. ................... | 715/205 |

(Continued)

FOREIGN PATENT DOCUMENTS

CN   101202755 A   6/2008

OTHER PUBLICATIONS

International Search Report mailed Mar. 1, 2012; PCT/CN2011/083548.

*Primary Examiner* — Khanh Dinh
(74) *Attorney, Agent, or Firm* — Harness, Dickey & Pierce, P.L.C.

(57) ABSTRACT

The present disclosure provides a method, device and system for obtaining a rich media file. The method includes: monitoring that a user has selected a rich media file link, sending a download request to a network server to download a rich media file corresponding to the rich media file link, in which the download request carries a terminal device identifier, a rich media file identifier and display screen information of a terminal device; obtaining and displaying the rich media file sent by the network server, in which the rich media file displayed is searched out and obtained by the network server according to the rich media file identifier, the rich media file is adjusted by the network server according to the display screen information of the terminal device, and is sent by the network server according to the terminal device identifier.

5 Claims, 2 Drawing Sheets

(56) References Cited

U.S. PATENT DOCUMENTS

| | | | |
|---|---|---|---|
| 8,396,944 B2 * | 3/2013 | Caruso et al. | 709/219 |
| 2008/0091526 A1 | 4/2008 | Shoemaker | |
| 2009/0063703 A1 | 3/2009 | Finkelstein et al. | |
| 2010/0095228 A1 | 4/2010 | Hwang et al. | |
| 2012/0203869 A1 * | 8/2012 | Caruso et al. | 709/219 |

* cited by examiner

METHOD, DEVICE AND SYSTEM FOR OBTAINING RICH MEDIA FILES

This application claims priority to a Chinese patent application 201010580734.3, titled "method, device and system for obtaining rich media files", which was filed on Dec. 6, 2010. The disclosures of the application No. 201010580734.3 are incorporated here by reference.

TECHNICAL FIELD

The present disclosure relates to Rich Media file processing technologies in a communication network, and more particularly, to a method, device and system for obtaining rich media files.

BACKGROUND OF THE INVENTION

With the development of computer network and communications technologies, obtaining relevant information via the Internet has become essential part of user's daily life and work. For example, when a user browses link information about fond rich media files from the Internet via a terminal device, in which the rich media files include network picture, animation and image. The user may click on the rich media. file link information, so as to trigger to generate a download request. Terminal device identifier and rich media file identifier may be carried by the download request. And then, the download request may be sent to a network server. The network server receives the download request, searches for a rich media file corresponding to the rich media file identifier in a rich media file database, outputs the Obtained rich media file to the terminal device corresponding to the terminal device identifier. Subsequently, the terminal device may obtain, store and display the rich media file issued by the network server.

In the prior art, take a network picture as an example, after receiving the download request from a user, a network server may send an original network picture stored in a network picture database to a terminal device. Alternatively, the network server may first resize the original network picture according to a picture size preset by operators based on their experience, and then send the resized network picture to the terminal device. When browsing the network picture downloaded with the terminal device, the user may adjust the displayed network picture with operation controls displayed on a screen interface. For example, the adjustment may include adjusting the displayed network picture to fit the screen size of the terminal device, so as to facilitate the user to browse.

Thus, it can be seen that, in the existing method for obtaining a network picture from a network server, a user needs to change size of the obtained network picture according to size of display screen of the terminal device, so as to facilitate browsing, which makes user operations cumbersome and affects user experience. More particularly, when there is a need to browse a large number of network pictures, the user needs to perform similar operations on each displayed network picture, which not only increase frequency of user's operations, but also affect user experience. Meanwhile, valuable time of the user may also be wasted. Furthermore, when size of the downloaded network picture is relatively large, compared with size of display screen of the terminal device, increased but unnecessary network load and traffic flow costs for the user may be incurred. When size of the downloaded network picture is relatively small, display effect of the downloaded network picture after being resized on the terminal device screen may be poor, and user's experience may be affected.

SUMMARY OF THE INVENTION

In view of above, the main objective of the present disclosure is to put forward a method for obtaining a rich media file, so as to reduce number of user operations to browse rich media files, save the user's time and improve the user experience.

Another objective of the present disclosure is to put forward a device for obtaining a rich media file, so as to reduce number of user operations to browse rich media files, save the user's time and improve the user experience.

Still another objective of the present disclosure is to put forward a system for obtaining a rich media file, so as to reduce number of user operations to browse rich media files, save the user's time and improve the user experience.

To achieve above objectives, the present disclosure provides a method for obtaining a rich media file, including:

monitoring that a user has selected a rich media file link, sending a download request to a network server to download a rich media file corresponding to the rich media file link, wherein the download request carries a terminal device identifier, a rich media file identifier and display screen information of a terminal device; and obtaining and displaying the rich media file sent by the network server, wherein the rich media file displayed is searched out and obtained by the network server, according to the rich media file identifier, the rich media file is adjusted by the network server according to the display screen information of the terminal device, and is sent by the network server according to the terminal device identifier.

The display screen information of the terminal device is set, according to preset prompt information.

Setting the display screen information of the terminal device, according to the preset prompt information includes:

when monitoring that the user has operated the rich media file link in a webpage, displaying a preset download interface to the user;

triggering a download control in the download interface, according to user's input, displaying the prompt information for the user, to prompt the user to set size of the terminal device display screen; and receiving the display screen information of the terminal device input by the user.

The download request further carries quality information about the rich media file.

Searching for and obtaining the rich media file by the network server according to the rich media file identifier, adjusting the obtained rich media file according to the display screen information of the terminal device, and sending the adjusted rich media file according to the terminal device identifier include:

searching, by the network server, in stored rich media files for the rich media file corresponding to the rich media file identifier, adjusting the rich media file searched out, to enable size of the rich media file searched out to be equal to the size of display screen of the terminal device, and sending the adjusted rich media file to the corresponding terminal device according to the terminal device identifier.

Sending the adjusted rich media file to the corresponding terminal device, according to the terminal device identifier includes:

obtaining quality information about the adjusted rich media file, and determining whether quality of the adjusted rich media file is higher than quality requirements of quality information about the rich media file carried in the download request;

when it is determined that the quality of the adjusted rich media file is higher than the quality requirements of quality information about the rich media file carried in the download request, processing the adjusted rich media file, to enable the quality of the adjusted rich media file to meet the quality requirements of quality information about the rich media file carried in the download request; and when it is determined that the quality of the adjusted rich media file is not higher than the quality requirements of quality information about the rich media file carried in the download request, sending the adjusted rich media file to the corresponding terminal device, according to the terminal device identifier.

Searching for and obtaining the rich media file by the network server according to the rich media file identifier, adjusting the obtained rich media file according to the display screen information of the terminal device, and sending the adjusted rich media file according to the terminal device identifier include:

obtaining, by the network server, display screen information of each terminal device in advance, and categorizing sizes according to a preset policy;

performing scaling process on rich media files stored in a rich media file library, according to categorized size, and storing all of the scaled rich media files into a rich media file database with size categorization; and receiving the download request sent by the terminal device, searching for and obtaining a rich media file library with size categorization close to the size of the terminal device display screen carried in the download request, searching for and obtaining the corresponding rich media file from the obtained rich media file library with size categorization, according to the rich media file identifier, and sending the rich media file according to the terminal device identifier.

Searching for and obtaining the corresponding rich media file, and sending the rich media file according to the terminal device identifier include:

obtaining quality information of the rich media file corresponding to the rich media file identifier;

determining whether quality of the rich media file corresponding to the rich media file identifier is higher than quality requirements of quality information about the rich media file carried in the download request;

when it is determined that the quality of the rich media file corresponding to the rich media file identifier is higher than the quality requirements of quality information about the rich media file carried in the download request, processing the rich media file corresponding to the rich media file identifier, to enable the quality of the processed rich media file to meet the quality requirements of quality information about the rich media file carried in the download request, and sending the processed rich media file to the corresponding terminal device, according to the terminal device identifier; and when it is determined that the quality of the rich media file corresponding to the rich media file identifier is not higher than the quality requirements of quality information about the rich media file carried in the download request, sending the rich media file corresponding to the rich media file identifier to the corresponding terminal device, according to the terminal device identifier.

Searching for and obtaining the corresponding rich media file, and sending the obtained rich media file according to the terminal device identifier include:

performing, by the network server, quality categorization on quality information about each rich media file received;

performing quality categorization storage for the rich media files with size categorization in the rich media file library with size categorization, according to the quality categorization; and searching for and obtaining a rich media file library with quality categorization that matches quality information of the rich media file according to the quality information of the rich media file carried in the download request, and obtaining the rich media file identifier and the rich media file corresponding to the display screen information of the terminal device from the rich media file library with quality categorization.

A device for obtaining a rich media file, in which the device including a rich media file monitoring module, a download request processing module, a sending module, a receiving module and a displaying module;

the rich media file monitoring module is configured to send a trigger signal to the download request processing module when monitoring that a user has operated a rich media file link in a webpage, wherein the trigger signal carries a rich media file identifier;

the download request processing module is configured to receive the trigger signal, display a preset download interface for the user, trigger a download control in the download interface according to the user's input, display prompt information for the user, to enable the user to set size of a terminal device display screen, receive display screen information of the terminal device input by the user, encapsulate the display screen information of the terminal device, the rich media file identifier and a terminal device identifier obtained in advance into a download request, and output the download request to the sending module;

the sending module is configured to send the received download request to an external network server;

the receiving module is configured to receive the rich media file sent by the external network server, and output the received rich media file to the displaying module; and the displaying module is configured to display the received rich media file.

The device further includes a rich media file storing module, which is to store the rich media file outputted by the receiving module.

A device for obtaining a rich media file, including a receiving module, a rich media file processing module and a sending module, wherein the receiving module is configured to receive a download request, and output the received download request to the rich media file processing module;

the rich media file processing module is configured to receive the download request, search for and obtain the rich media file according to a rich media file identifier carried in the download request, wherein the rich media file has been adjusted according to display screen information of a terminal device, and output the adjusted rich media file to the sending module; and the sending module is configured to send the rich media file outputted by the rich media file processing module to the corresponding terminal device, according to a terminal device identifier.

The device further includes a rich media file compressing module configured to compress the rich media file outputted by the rich media file processing module, and then output the compressed rich media file to the sending module.

The rich media file processing module includes a rich media file storing unit, a rich media file searching unit, and a rich media file adjusting unit, the rich media file storing unit is to store rich media files;

the rich media file searching unit is configured to receive the download request, search in the rich media files stored in the rich media file storing unit for the rich media file corresponding to the rich media file identifier, which is carried in the download request, and output the download request and the rich media file searched out to the rich media file adjusting unit; and the rich media file adjusting unit is configured to, according to the display screen information of the terminal device carried in the download request, adjust the received rich media file, to enable size of the adjusted rich media file to be equal to size of display screen of the terminal device, and output the adjusted rich media file to the sending module.

The device further includes a. rich media file quality processing module, configured to receive the rich media file outputted by the rich media file adjusting unit, obtain quality information about the rich media file, and determine whether quality of the rich media file is higher than quality requirements in quality information about the rich media file carried in the download request;

when it is determined that the quality of the rich media file is higher than the quality requirements in the quality information about the rich media file carried in the download request, the rich media file quality processing module is further configured to process the rich media file, to enable the quality of the processed rich media file to meet the quality requirements in the quality information about the rich media file carried in the download request, and output the processed rich media file to the sending module;

when it is determined that the quality of the rich media file is not higher than the quality requirements in the quality information about the rich media file carried in the download request, the rich media file quality processing module is further configured to output the rich media file to the sending module.

The rich media file processing module further includes a unit for categorizing size of terminal device display screen, a rich media file storing unit, a unit for storing rich media files with size categorization and a rich media file searching unit, the unit for categorizing size of display screen of terminal device is configured to perform size categorization on display screen size of terminal device, which is obtained in advance, according to a preset policy, and store categorized result;

the rich media file storing unit is configured to store rich media files;

the unit for storing rich media files with size categorization is configured to read the rich media files stored in the rich media file storing unit, perform scaling processes on the rich media files, according to size categorization of the unit for categorizing size of display screen of terminal device, and store the scaled rich media files in categorization; and the rich media file searching unit is configured to, according to the display screen information of the terminal device carried in the download request, receive the download request, search for and obtain a rich media file storing unit with size categorization close to the display screen size of the terminal device, search for and obtain the corresponding rich media file in the rich media file storing unit with the size categorization, according to the rich media file identifier, and output the obtained rich media file to the sending module.

The device further includes a rich media file quality processing module configured to receive the rich media file outputted by the rich media file searching unit, obtain quality information of the rich media file, and determine whether quality of the rich media file is larger than the quality requirements in the quality information about the rich media file carried in the download request;

when determining the quality of the rich media file is higher than the quality requirements in the quality information about the rich media file carried in the download request, the rich media file quality processing module is configured to process the rich media file, to enable the quality of the processed rich media file to meet the quality requirements in the quality information of the rich media file carried in the download request, and output the rich media file processed to the sending module;

when it is determined that the quality of the rich media file is not higher than the quality requirements in the quality information about the rich media file carried in the download request, the rich media file quality processing module is configured to output the rich media file to the sending module.

A system for obtaining a rich media file, including a terminal device and a network server, wherein the terminal device is configured to, when monitoring that a user has selected the rich media file link, send a download request to the network server, to download a corresponding rich media file corresponding to a rich media file link, receive and display the rich media file sent by the network server, the download request carries a terminal device identifier, a rich media file identifier and display screen information of the terminal device, and the network server is configured to receive the download request sent by the terminal device, search for and obtain the rich media file according to the rich media file identifier carried in the download request, wherein the rich media file is adjusted according to the display screen information of the terminal device, and send the adjusted rich media file according to the terminal device identifier.

The terminal device includes a rich media file monitoring module, a download request processing module, a sending module, a receiving module and a displaying module, the rich media file monitoring module is configured to send a trigger signal to the download request processing module, when monitoring that the user has operated the rich media file link in a webpage, wherein the trigger signal carries the rich media file identifier;

the download request processing module is configured to receive the trigger signal, display a preset download interface for the user, trigger a download control in the download interface, according to the user's input, display prompt information for the user, to enable the user to set size of display screen of the terminal device, receive the display screen information of the terminal device inputted by the user, encapsulate the display screen information of the terminal device, the rich media file identifier and the terminal device identifier obtained in advance into the download request, and output the download request to the sending module;

the sending module is configured to send the received download request to an external network server;

the receiving module is configured to receive the rich media file sent by the external network server, and output the received rich media file to the displaying module; and the displaying module is configured to display the received rich media file.

The network server includes a receiving module, a rich media file processing module and a sending module, the receiving module is configured to receive the download request, and output the received download request to the rich media file processing module;

the rich media file processing module is configured to receive the download request, search for and obtain the rich media file, according to the rich media file identifier carried in the download request, wherein the rich media file is adjusted according to the display screen information of the terminal device, and output the adjusted rich media file to the sending module; and the sending module is configured to send the rich media file outputted by the rich media file processing module to the corresponding terminal device, according to the terminal device identifier.

Based on above technical solution, it can be seen that, in the method, device and system for obtaining a rich media file put forward by the present disclosure, when monitoring a user selects rich media file link information, send a download request to a network server to download a rich media file corresponding to the rich media file link information, in which the download request carries terminal device identifier, rich media file identifier and display screen information of terminal device; obtain and display the rich media file sent by the network server, in which the displayed rich media file is searched out and obtained by the network server, according to the rich media file identifier. The displayed rich media file, which is adjusted by the network server according to the display screen information of the terminal device, may be sent out based on the terminal device identifier. Thus, the rich media file displayed by the terminal device may be adapted for the display screen of the terminal device. Comfortable browsing may be achieved, without being adjusted by the user. Subsequently, when a user browses rich media files, number of operations may be effectively reduced. Time needed for adjusting the rich media files by the user may be saved, and user experience may be improved.

BRIEF DESCRIPTIONS OF THE DRAWINGS

EMBODIMENTS OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

In the prior art, take a network picture as an example, a user may click on network picture link information of a network server, so as to send a download request to the network server to download the network picture. Since network pictures may be of different sizes, operations may be complicated and operation time may be longer when the user browses downloaded pictures. The examples of the present disclosure take into account the network picture link information of the network server on which the user clicks, and include in the download request size of the terminal device display screen when sending the download request to the network server to download the network picture. Thus, the network server may adjust the network picture requested by the user according to the received size of display screen of the terminal device, and then send the adjusted network picture to the terminal device.

It should be noted that, in an example of the present disclosure, descriptions are provided about how to obtain a network picture. Techniques to obtain other media information, such as an animation, a video clip or image from a rich media file is similar to the method to obtain a network picture and will not be repeated in the following.

Figure 1:
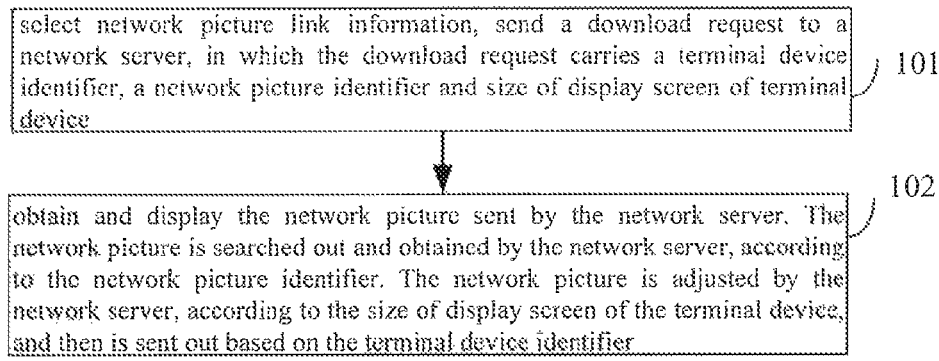
FIG. 1 is a flowchart illustrating a method for obtaining a network picture, in accordance with an example of the present disclosure.

FIG. 1 is a flowchart illustrating a method for obtaining a network picture, in accordance with an example of the present disclosure. With reference to FIG. 1, the flow includes the following blocks.

In block 101, the method includes selecting network picture link information, and sending a download request to a network server. The download request carries a terminal device identifier, a network picture identifier and size of display screen of terminal device.

In this block, when browsing his or her favorite network pictures from the Internet, a user may select to download from a pop-up menu by clicking on the network picture link information, so as to trigger a. download request to be generated for downloading a rich media file corresponding to the rich media file link information and the download request to be sent to the network server. The download request carries the terminal device identifier, the network picture identifier and the size of display screen of terminal device.

The terminal device identifier may be an identifier of the terminal device that is in communication with the network server when the user browses network pictures from the Internet. Alternatively, the terminal device identifier may be an identifier of another terminal device defined by the user. The terminal device identifier will be used in subsequent flows such that he network server may send the processed network picture to the terminal device corresponding to the terminal device identifier. The terminal device identifier may be determined by terminal device type. For example, the terminal device identifier may be an Internet Protocol (IP) address for terminal device such as a computer; for another example, the terminal device identifier may be a Subscriber Identity Module (SIM) number for terminal device such as a mobile phone or a Personal Digital Assistant (PDA).

The size of display screen of terminal device may be set by using prompt information of pop-up menu. For example, a user's click on a network picture to be downloaded from the Internet, triggers a preset download menu to pop out. The download menu includes a download control and a cancel control. When the user selects the download control, a prompt box pops up to prompt the user to set size of display screen of the terminal device. And then, the user may input display screen size of the corresponding terminal device into the prompt box, so as to generate the download request. For the terminal device in communication with the network server, size of display screen stored inside the terminal device may also be obtained with a preset call function. Techniques of obtaining display screen size with the call function may be found in relevant technical literature.

In practical applications, the download request may also carry network picture quality information, which may be set with prompt information of a pop-up menu. Similar to setting size of display screen of the terminal device, when the user selects the download control, a prompt box to prompt the user to set size of the terminal device display screen and another prompt box to prompt the user to set quality information of network picture may respectively pops up according to preset configuration, and then the user may set corresponding size and quality information.

In block 102, the network picture sent by the network server is obtained and displayed. The network picture is searched out and obtained by the network server according to the network picture identifier. The network picture is then adjusted by the network server according to the size of display screen of the terminal device and sent out based on the terminal device identifier.

This block may include, as a first technical solution, the following processes about the network server searching out and obtaining the network picture according to the network picture identifier, adjusting the network picture according to the size of display screen of the terminal device, and sending out the network picture according to the terminal device identifier. The network server searches in stored network pictures for a network picture corresponding to the network picture identifier, adjusts the searched out network picture to fit the size the terminal device display screen, according to the size information of the terminal device display screen carried in the download request received, and sends the adjusted network picture to the corresponding terminal device based on the terminal device identifier. That is, the network server receives the download request sent by the terminal device, searches in a stored network picture library for a network picture corresponding to the network picture identifier in the download request, and according to the size information of the terminal device display screen carried in the download request received, adjusts the network. picture found to fit the size of the terminal device display screen, and sends the adjusted network picture to the corresponding terminal device based on the terminal device identifier. For example, when size of display screen of the terminal device carried in the download request is 240*320, size of the network picture searched out is 500*400, the network picture searched out may then be scaled down. Width of the network picture may be first scaled down from 500 to 240. And then, height of the network picture may be scaled down from 400 to 320. Relevant technical literatures may be referred for techniques of scaling processes performed by the network server on the network. Thus, after sending the network picture to the terminal device, full-screen displaying of the network picture on the display screen of the terminal device may be guaranteed number of operations may be reduced When a user browses network pictures, and user experience may be improved. Definitely, in practical applications, a user may also set size of display screen of the terminal device to be another size, such as ¾ size of the display screen, according to requirements of easy browsing.

In practical applications, to save network resources, after performing scaling processes on the network pictures, the network server may also perform compression processes on the scaled network picture. After receiving the compressed network pictures, the terminal device may de-compress and store the de-compressed network pictures.

In practical applications, since there may be various display screens of terminal device, sizes thereof may also be different from each other. If the network server respectively performs scaling processes on a network picture requested to be downloaded by each user, resources of the network server may be greatly wasted. Thus, in the example of the present disclosure, a. second technical solution may include the following processes about the network server searching out and obtaining the network picture according to the network picture identifier, adjusting the network picture according to size of display screen of the terminal device, and sending out the adjusted network picture according to the terminal device identifier. The network server obtains size of display screen of each terminal device in advance, and categorizes the sizes according to a preset policy. And then, the network server may perform scaling processes on the network pictures stored in a network picture library according to categorized sizes, and store the processed network pictures into the network picture library with categorized sizes. After receiving the download request sent by the terminal device and based on the size of display screen of terminal device carried in the download request, the network server searches for and obtains a network picture library with categorized sizes similar to the size of the terminal device display screen. The network server then searches for and obtains a corresponding network picture in the network picture library with the categorized size according to the network picture identifier, and sends the network picture obtained based on the terminal device identifier. Thus, processing time of the network pictures may be reduced when the network server receives the download request, response speed of the network server may be improved, and processing resources of the network server may be saved.

As mentioned above, when the download request carries the network picture quality information, the foregoing first technical solution include the following processes about sending the adjusted network picture to the corresponding terminal device according to the terminal device identifier. Specifically, the network server obtains the adjusted network picture quality information, determines whether the adjusted. network picture quality is higher than quality requirement in the network picture quality information carried in the download request. When the adjusted network picture quality is higher than the quality requirements in the network picture quality information carried in the download request, the network server processes the adjusted network picture to to make its quality meet the quality requirements in the network picture quality information, and sends to the corresponding terminal device according to the terminal device identifier. Otherwise, the network server sends the adjusted network picture to the corresponding terminal device according to the terminal device identifier. The foregoing second technical solution include the following processes about searching for and obtaining the corresponding network picture, and sending the obtained network picture according to the terminal device identifier. The network obtains the network picture quality information corresponding to the network picture identifier, and determines whether the network picture quality corresponding to the network picture identifier is higher than the quality requirements in the network picture quality information carried in the download request. When it is determined that the network picture quality corresponding to the network picture identifier is higher than the quality requirements in the network picture quality information carried in the download request, the network server processes the network picture corresponding to the network picture identifier to make its quality meet the quality requirements in the network picture quality information, and sends the processed network picture to the corresponding terminal device according to the terminal device identifier. Otherwise, the network server sends the network picture corresponding to the network picture identifier to the corresponding terminal device according to the terminal device identifier.

In practical applications, the network server may also perform quality categorization on quality information of each received network picture according to a preset policy. And then, according to the quality categorization, the network server may perform quality categorization storage on the network pictures categorized by size and stored in the network picture library with size categorization. After receiving the download request sent by the terminal device, the network server first obtains the network picture library with size categorization corresponding to the size of display screen of the terminal device. And then, according to the network picture quality information carried in the download request, the network server searches for and obtains a network picture library with quality categorization, which is close to the quality requirements in the network picture quality information. The network server then obtains the network picture corresponding to the network picture identifier from the network picture library with quality categorization.

In the example of the present disclosure, the quality categorization level may include mini-level, low-level, normal-level and high-level.

From above descriptions, it can be seen that, in the method for obtaining a network picture in accordance with an example of the present disclosure, the above network picture is searched out and obtained by the network server according to the network picture identifier by selecting network picture link information, sending to a network server a download request that carries a terminal device identifier, a network picture identifier and size of display screen of terminal device obtaining and displaying the network picture sent by the network server. The network picture is also adjusted by the network server, according to the size of display screen of the terminal device, and then is sent out based on the terminal device identifier. Thus, the network picture displayed by the terminal device is adapted to fit the size of the terminal device display screen. Easy browsing may be achieved without adjustment by the user. Number of user operations may be reduced when the user browses network pictures, and the time for adjusting the network pictures may also be saved. Furthermore, when size of the original network picture is relatively large, network loads and network flow costs necessary for the user's downloading may be effectively reduced by adjusting the size of the original network picture to be smaller. When size of the original network picture is relatively small, the size of the original network picture may be adjusted to be larger to improve display effect of the network picture on the terminal device display screen, so as to improve the user experience.

Descriptions will be provided in the following about a system for obtaining a network picture, in accordance with an example of the present disclosure.

Figure 2:
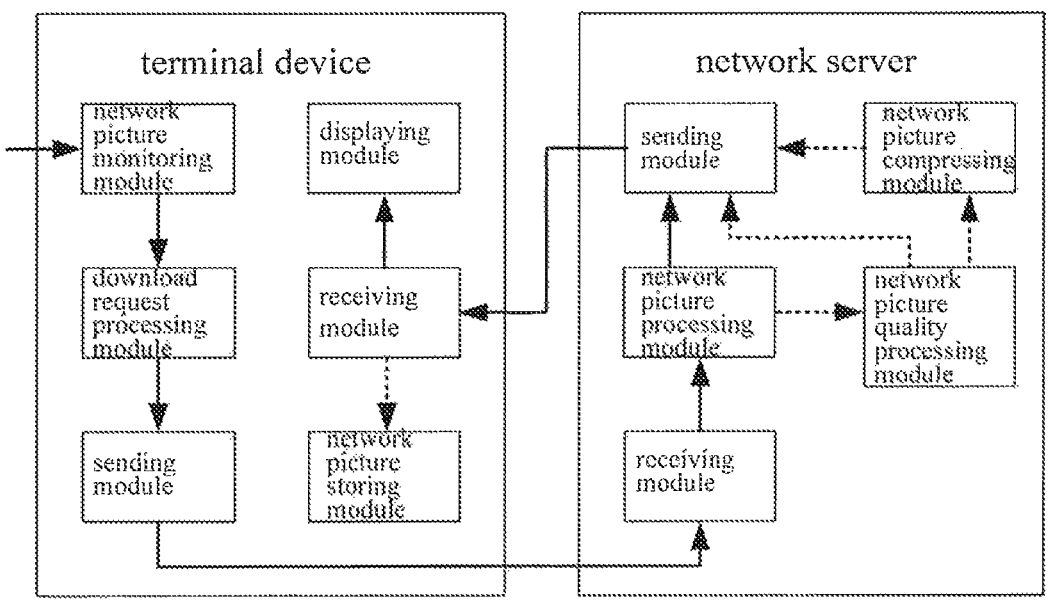
FIG. 2 is a schematic diagram illustrating structure of a system for obtaining a network picture, in accordance with an example of the present disclosure.

FIG. 2 is a schematic diagram illustrating structure of a system for obtaining a network picture in accordance with an example of the present disclosure. With reference to FIG. 2, the system includes a terminal device and a network server.

The terminal device is configured to send a download request to the network server, to download a rich media file corresponding to network picture link information, after monitoring that a user has selected the network picture link information, in which the download request carries a terminal device identifier, a network picture identifier and size information of the terminal device display screen. The terminal device is further configured to receive and display a network picture sent by the network server.

The network server is configured to receive the download request sent by the terminal device, search for and obtain the network picture according to the network picture identifier carried in the download request, adjust the network picture according to size of display screen of the terminal device, and then send the adjusted network picture according to the terminal device identifier.

In the example of the present disclosure, the terminal device includes a network picture monitoring module, a download request processing module, a sending module, a receiving module and a displaying module.

The network picture monitoring module is configured to send a trigger signal to the download request processing module, after monitoring that the user has operated the network picture link information in a webpage, in which the trigger signal carries the network picture identifier.

In the example of the present disclosure, monitoring whether the user has operated the network picture link information in the webpage may be implemented by monitoring whether the user's mouse has clicked on the network picture link information, or whether residence time of the user's mouse on the network picture link information is longer than a preset time. When the user's mouse clicks on the network picture link information, or the residence time of the user's mouse on the network picture link information is longer than the preset time, the network picture monitoring module determines that the user has operated the network picture link information in the webpage. The preset time is to demonstrate that the user pays close attention to the network picture link information, instead of omitting the network picture link information when browsing. The preset time may be set according to actual requirements.

The download request processing module is configured to receive the trigger signal, display a preset download menu for the user, and receive information input by the user. When triggering download control information is included, the download request processing module displays a prompt box for the user to enable the user to set size of the terminal device display screen. The download request processing module also receives the size of the terminal device display screen size input by the user, encapsulates the size of display screen of the terminal device, the network picture identifier and the terminal device identifier obtained in advance into the download request, and outputs the download request to the sending module.

in the example of the present disclosure, when the prompt box for the user is displayed to enable the user to set the size of display screen of the terminal device, another prompt box for prompting the user to set the terminal device identifier may also be displayed at the same time so as to display terminal device identifiers obtained previously. The prompt box prompting the user to set the terminal device identifier includes a local identifier control that identifies the local terminal device and identifier controls about other terminal device. When the user selects the local identifier control, the terminal device may automatically obtain the local identifier. When the user selects the identifier control about other terminal devices, the user may then input a corresponding terminal device identifier.

The sending module is configured to send the received download request to external network servers.

The receiving module is configured to receive the network picture sent by external network servers, and output to the displaying module.

The displaying module is configured to display the received network picture.

Preferably, the terminal device may also include a network picture storing module, which is configured to store network pictures output by the receiving module.

The network server includes a receiving module, a network picture processing module and a sending module.

The receiving module is configured to receive the download request, and output to the network picture processing module.

The network picture processing module is configured to receive the download request, search for and obtain a network picture according to the network picture identifier carried in the download request, adjust the obtained network picture according to the size information of the terminal device display screen, and output the adjusted network picture to the sending module.

The sending module is configured to send the network picture output by the network picture processing module to a corresponding terminal device, according to the terminal device identifier.

Furthermore, the network server may also include a network picture compressing module, which is configured to compress the network picture output by the network picture processing module, and then output the compressed network picture to the sending module.

Preferably, the network picture processing module includes a network picture storing unit, a network picture searching unit and a network picture adjusting unit (not shown in the figure).

The network picture storing unit is to store network pictures.

The network picture searching unit is configured to receive the download request, search in the network pictures stored by the network picture storing unit for a network picture corresponding to the network picture identifier carried in the download request, output the download request and the network picture searched out to the network picture adjusting unit.

The network picture adjusting unit is to adjust the received network picture, to enable size thereof to be equal to size of display screen of the terminal device according to the size of display screen of the terminal device carried in the download request, and then output the adjusted network picture to the sending module.

Regarding the foregoing first technical solution, in the example of the present disclosure, the network server may further include a network picture quality processing module, which is to receive the network picture output by the network picture adjusting unit, obtain network picture quality information, determine whether the network picture quality is higher than quality requirements in the network picture quality information carried in the download request. When determining that the network picture quality is higher than the quality requirements in the network picture quality information carried in the download request, the network picture quality processing module is further configured to process the network picture, to enable quality thereof to meet the quality requirements in the network picture quality information, and output the processed network picture to the sending module. Otherwise, the network picture quality processing module is to directly output the network picture to the sending module.

Regarding the foregoing second technical solution, preferably, the network picture processing module may further include: a unit for categorizing size of terminal device display screen, a network picture storing unit, a unit for storing network pictures with size categorization, and a network picture searching unit (not shown in the figure).

The unit for categorizing size of display screen of terminal device is configured to perform size categorization on sizes of terminal device display screen previously obtained according to a preset policy, and then store the processing result.

The network picture storing unit is to store the network pictures.

The unit for storing network pictures with size categorization is to read the network pictures stored by the network picture storing unit, perform scaling processes according to the size categorization of the unit for categorizing sizes of terminal device display screens, and then store the categorized network pictures.

The network picture searching unit is configured to receive the download request, search for and obtain a unit for storing network pictures with size categorization that is close to size of the terminal device display screen according to the size information of the terminal device display screen carried in the download request. The network picture searching unit is further configured to obtain, according to the network picture identifier, a corresponding network picture from the unit for storing network pictures with size categorization, and then output the obtained network picture to the sending module.

Correspondingly, in the example of the present disclosure, the network server may further include a network picture quality processing module, which is configured to receive the network picture output by the network picture searching unit, obtain the network picture quality information, determine whether the network picture quality is higher than quality requirements of the network picture quality information carried in the received download request. When it is determined that the network picture quality is higher than the quality requirements of the network picture quality information carried in the received download request, the network picture quality processing module will process the network picture to enable quality thereof to meet the quality requirements of the network picture quality information, and output the processed network picture to the sending module. Otherwise, the network picture quality processing module will directly output the network picture to the sending module.

An example is provided in the following, in which the network server categorizes network pictures in advance, and the terminal device is a mobile phone. Detailed descriptions about a method to obtain a network picture in accordance with an example of the present disclosure are provided.

Figure 3:
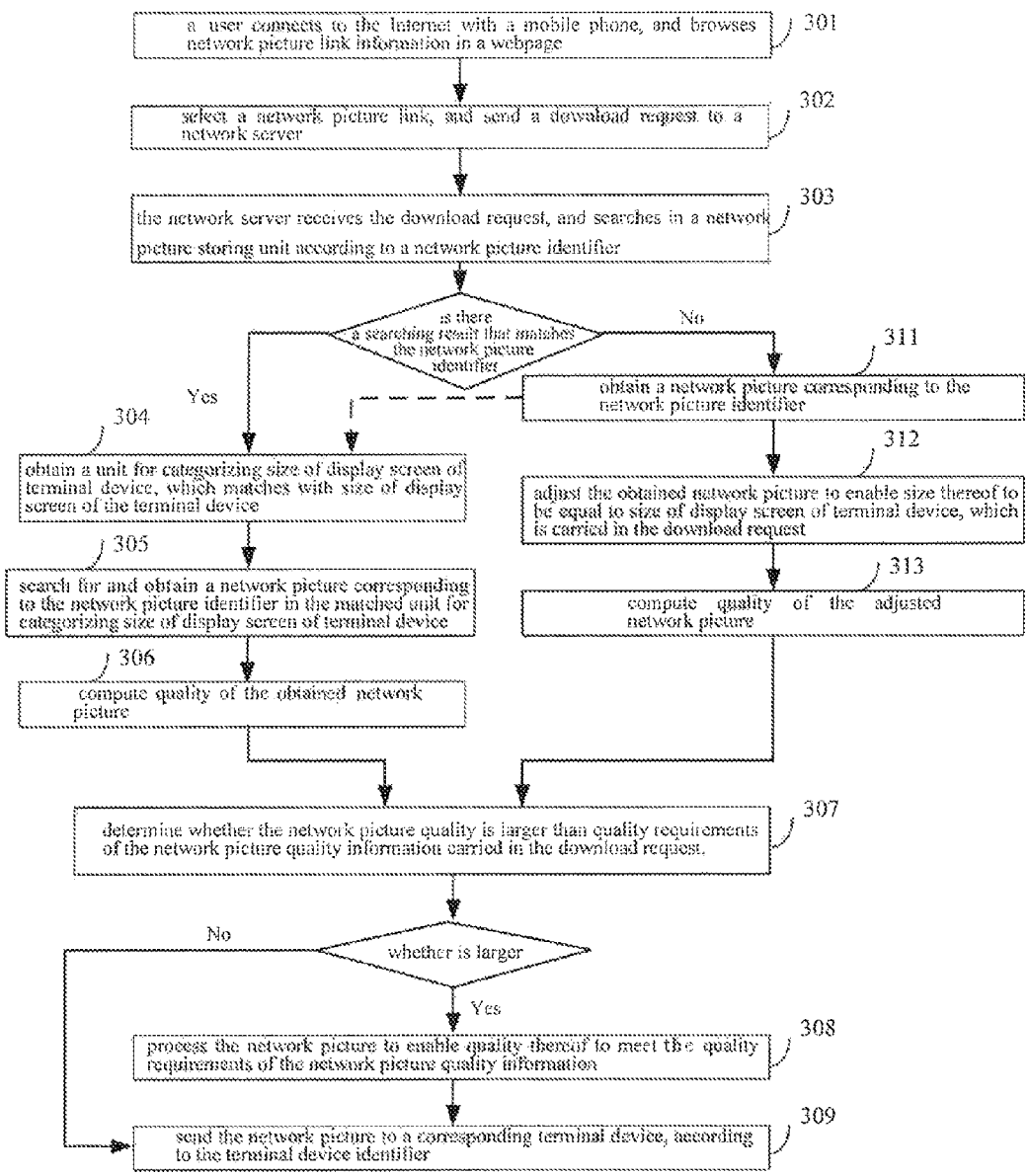
FIG. 3 is another flowchart illustrating a method for obtaining a network picture, in accordance with an example of the present disclosure.

FIG. 3 is a flowchart illustrating a method for obtaining a network picture, in accordance with an example of the present disclosure. With reference to FIG. 3, the flow includes the following blocks.

In block 301, a user connects to the network with a mobile phone, and browses network picture link information in a webpage.

In block 302, the user selects network picture link information, and the mobile phone sends a download request to a network server.

In block 302, when browsing network pictures, the user determines a network picture to download, and clicks on the network picture. The mobile phone may obtain the network picture identifier. And then, a preset download menu may pop up on a mobile phone screen. The user may click on a download control of the download menu. Then the following prompt boxes may pop up: a first prompt box to prompt the user to set size of the terminal device display screen, a second prompt box to prompt the user to set terminal device identifier, and a third prompt box to prompt the user to set network picture quality information. The first prompt box to prompt the user to set size of the terminal device display screen includes full-screen size of the terminal device and user-defined screen size information. Thus, the user may select a full-screen size control of the terminal device, or the user may define a screen size according to the displayed fill-screen size information of the terminal device, i.e., the user may select a user-defined screen size control. The second prompt box to set the terminal device identifier includes a local identifier control that identifies the local terminal device and an identifier control about other terminal device. The third prompt box to set the network picture quality information includes default quality information of the mobile phone and user-defined network picture quality information. The user may input necessary network picture quality information, according to the default quality information displayed. In this example, the user selects the full-screen size control of the terminal device, the local identifier control and the default quality information. The mobile phone may encapsulate the obtained size of the terminal device display screen, the terminal device identifier, the network picture identifier and the network picture quality information, generate the download request, and send the download request to the network server.

In block 303, the network server receives the download request, and searches in the network picture storing unit according to the network picture identifier. When there is a searching result that matches the network picture identifier, the process proceeds to block 304; otherwise, the process proceeds to block 311.

In block 304, the network server obtains a unit for categorizing sizes of terminal device display screen. The unit matches the size of the terminal device display screen.

In block 304, suppose the network server stores in advance the network pictures with two sizes of the terminal device display screen, which corresponds to screen sizes of two types of mainstream mobile phones. Screen sizes of the two types of mainstream screen are respectively 240*320 and 320*480. When the size of the terminal device display screen, i.e., actual size of the mobile phone screen is 300*400, the unit for categorizing sizes of terminal device display screen matched by the network server corresponds to 240*320.

In block 305, the network server searches for a network picture corresponding to the network picture identifier in the matched unit for categorizing sizes of terminal device display screen, and obtains the network picture.

In block 306, the network server computes the quality of the obtained network picture.

Techniques for implementing block 306 may be found in the prior art.

In block 307, the network server determines whether the network picture quality is larger than quality requirements of the network picture quality information carried in the download request. If the determination result is yes, the process proceeds to block 308; otherwise, proceed to block 309.

In block 308, the network server processes the network picture to enable quality thereof to meet the quality requirements of the network picture quality information.

In block 309, the network server sends the network picture to a corresponding terminal device according to the terminal device identifier.

In block 311, the network server obtains a network picture corresponding to the network picture identifier.

In block 311, the network server may first pull the network picture corresponding to the network picture identifier from the Internet, and then write into the network picture storing unit.

In practical applications, after obtaining the network picture corresponding to the network picture identifier, the network server may first categorize the network picture according to preset size of display screen of the terminal device, and store the categorized network picture into a corresponding unit for categorizing size of terminal device display screen. Then the process may return to block 304. In this example, detailed descriptions on the above process are skipped.

In block 312, the network server adjusts the obtained network picture to enable size thereof to be equal to size of display screen of terminal device carried in the download request.

In this block, when size of the obtained network picture is larger than the size of the terminal device display screen, the network server scales down the obtained network picture. When size of the obtained network picture is equal to the size of the terminal device display screen, no process will be executed. When size of the obtained network picture is smaller than the the size of the terminal device display screen, the network server scales up the obtained network picture.

In block 313, the network server computes the quality of adjusted network picture, and then proceeds to block 307.

And then, the flow from block 311. to block 313 is completed. Process from block 307 to block 309 will not be repeated here.

The foregoing is only preferred examples of the present disclosure, which is not used for limiting protection scope of the present disclosure. Any modifications, equivalent substitutions and improvements made within the scope and principle of the present disclosure, should be covered by the protection scope of the present disclosure.

The invention claimed is:

1. A method for obtaining a rich media file, comprising:
monitoring that a user has selected a rich media file link, sending a download request to a network server to download a rich media file corresponding to the rich media file link, wherein the download request carries a terminal device identifier, a rich media file identifier and display screen information of a terminal device; and
obtaining and displaying the rich media file sent by the network server, wherein the rich media file displayed is searched out and obtained by the network server according to the rich media file identifier, the rich media file is adjusted by the network server according to the display screen information of the terminal device, and is sent by the network server according to the terminal device identifier;
wherein the display screen information of the terminal device is set, according to preset prompt information;
wherein setting the display screen information of the terminal device according to the preset prompt information comprises:
when monitoring that the user has operated the rich media file link in a webpage, displaying a preset download interface to the user;
triggering a download control in the download interface according to user's input, displaying the prompt information for the user to prompt the user to set size of the terminal device display screen; and
receiving the display screen information of the terminal device input by the user;
wherein the download request further carries quality information about the rich media file;
wherein searching for and obtaining the corresponding rich media file, and sending the obtained rich media file according to the terminal device identifier comprise:
performing, by the network server, quality categorization on quality information about each rich media file received;
performing quality categorization storage for the rich media files with size categorization in the rich media file library with size categorization, according to the quality categorization; and
searching for and obtaining a rich media file library with quality categorization that matches quality information of the rich media file according to the quality information of the rich media file carried in the download request, and obtaining the rich media file identifier and the rich media file corresponding to the display screen information of the terminal device from the rich media file library with quality categorization.

2. A device for obtaining a rich media file, comprising a receiving module, a rich media file processing module and a sending module, wherein the receiving module is configured to receive a download request, and output the received download request to the rich media file processing module;

the rich media file processing module is configured to receive the download request, search for and obtain the rich media file according to a rich media file identifier carried in the download request, wherein the rich media file has been adjusted according to display screen information of a terminal device, and output the adjusted rich media file to the sending module; and the sending module is configured to send the rich media file output by the rich media file processing module to the corresponding terminal device according to a terminal device identifier;

wherein the rich media file processing module comprises a rich media file storing unit, a rich media file searching unit, and a rich media file adjusting unit, the rich media file storing unit is configured to store rich media files;

the rich media file searching unit is configured to receive the download request, search in the rich media files stored in the rich media file storing unit for the rich media file corresponding to the rich media file identifier, which is carried in the download request, and output the download request and the rich media file searched out to the rich media file adjusting unit; and the rich media file adjusting unit is configured to, according to the display screen information of the terminal device carried in the download request, adjust the received rich media file to enable size of the adjusted rich media file to be equal to size of display screen of the terminal device, and output the adjusted rich media file to the sending module;

wherein the device further comprises a rich media file quality processing module configured to receive the rich media file output by the rich media file adjusting unit, obtain quality information about the rich media file, and determine whether quality of the rich media file is higher than quality requirements in quality information about the rich media file carried in the download request;

when it is determined that the quality of the rich media file is higher than the quality requirements in the quality information about the rich media file carried in the download request, the rich media file quality processing module is further configured to process the rich media file to enable the quality of the processed rich media file to meet the quality requirements in the quality information about the rich media file carried in the download request, and output the processed rich media file to the sending module;

when it is determined that the quality of the rich media file is not higher than the quality requirements in the quality information about the rich media file carried in the download request, the rich media file quality processing module is further configured to output the rich media file to the sending module.

3. The device according to claim 2, wherein the device further comprises:

a rich media file compressing module configured to compress the rich media file outputted by the rich media file processing module, and then output the compressed rich media file to the sending module.

4. A device for obtaining a rich media file, comprising a receiving module, a rich media file processing module and a sending module, wherein the receiving module is configured to receive a download request, and output the received download request to the rich media file processing module;

the rich media file processing module is configured to receive the download request, search for and obtain the rich media file according to a rich media file identifier carried in the download request, wherein the rich media file has been adjusted according to display screen information of a terminal device, and output the adjusted rich media file to the sending module; and the sending module is configured to send the rich media file output by the rich media file processing module to the corresponding terminal device according to a terminal device identifier;

wherein the rich media file processing module further comprises a unit for categorizing size of terminal device display screen, a rich media file storing unit, a unit for storing rich media files with size categorization and a rich media file searching unit, the unit for categorizing size of display screen of terminal device is configured to perform size categorization on display screen size of terminal device, which is obtained in advance, according to a preset policy, and store categorized result;

the rich media file storing unit is configured to store rich media files;

the unit for storing rich media files with size categorization is configured to read the rich media files stored in the rich media file storing unit, perform scaling processes on the rich media files according to size categorization of the unit for categorizing size of display screen of terminal device, and store the scaled rich media files in categorization; and the rich media file searching unit is configured to, according to the display screen information of the terminal device carried in the download request, receive the download request, search for and obtain a rich media file storing unit with size categorization close to the display screen size of the terminal device, search for and obtain the corresponding rich media file in the rich media file storing unit with the size categorization according to the rich media file identifier, and output the obtained rich media file to the sending module.

5. The device according to claim 4, wherein the device further comprises a rich media file quality processing module configured to receive the rich media file output by the rich media file searching unit, obtain quality information of the rich media file, and determine whether quality of the rich media file is larger than the quality requirements in the quality information about the rich media file carried in the download request;

when determining the quality of the rich media file is higher than the quality requirements in the quality information about the rich media file carried in the download request, the rich media file quality processing module is configured to process the rich media file to enable the quality of the processed rich media file to meet the quality requirements in the quality information of the rich media file carried in the download request, and output the rich media file processed to the sending module;

when it is determined that the quality of the rich media file is not higher than the quality requirements in the quality information about the rich media file carried in the download request, the rich media file quality processing module is configured to output the rich media file to the sending module.

\* \* \* \* \*